Figures 1, 2:
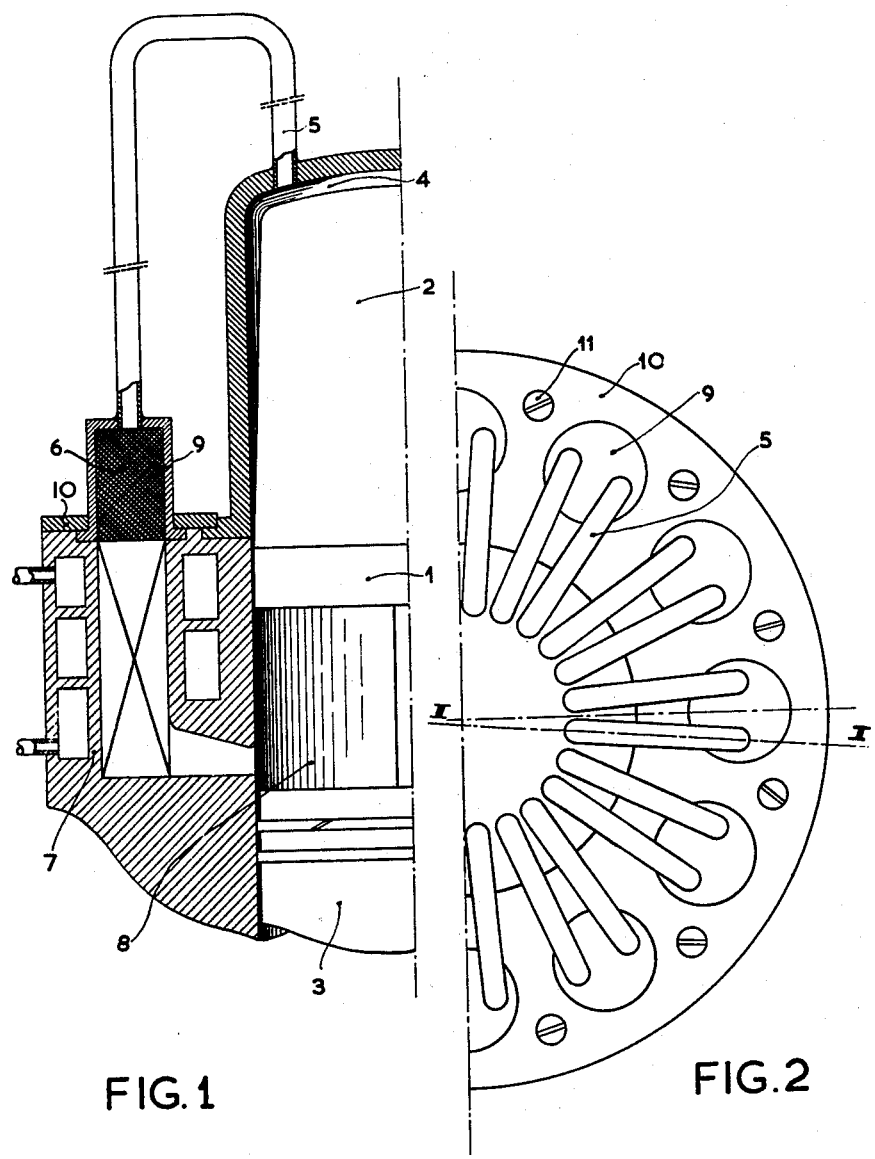

United States Patent Office 2,959,019
Patented Nov. 8, 1960

2,959,019

THERMO-DYNAMIC RECIPROCATING APPARATUS

Roelf Jan Meijer, Eindhoven, Netherlands, assignor to North American Philips Company, Inc., New York, N.Y., a corporation of Delaware Filed Sept. 9, 1959, Ser. No. 682,707

Claims priority, application Netherlands Sept. 12, 1956

3 Claims. (Cl. 62—6)

This invention relates to thermo-dynamic reciprocating apparatus, comprising an expansion space and a compression space which are in free communication with one another through a heat-exchanger, a regenerator and a second heat-exchanger, the volumetric capacities of the expansion space and the compression space being varied with a substantially constant phase difference and a gas of invariable chemical composition performing a closed thermo-dynamic cycle in the apparatus, during which cycle the gas is invariably in the same physical state.

The term "thermo-dynamic reciprocating apparatus" is to be understood to include hot-gas engines, refrigerators and heat pumps, the two last-mentioned types of apparatus operating according to the reversed hot-gas engine principle. As is known such apparatus may be built in a variety of types, for example as a displacer apparatus, a double-acting engine or an engine, the cylinders of which contain the expansion space and the compression space and subtend an angle.

In such apparatus it is usual to house the regenerator in a ring-shaped space surrounding a cylinder of the apparatus.

If the power supplied or taken by the apparatus is increased, for example by increasing the cylinder diameter or by raising the pressure level at which the cycle occurs, or again by increasing both of them, this will involve that, for the sake of strength, the walls bounding the regenerator space, that is to say the cylindrical sidewall and the wall or walls near the regenerator end faces, must be thicker than in the case of a smaller apparatus. However, in engines, the temperature drop across the cylindrical sidewall is, for example, 600° C. and, in refrigerators, for example 300° C., which may result in unduly high stresses arising in the wall due to such considerable temperature differences.

The present invention has for its object to design the apparatus so that the stresses in the wall bounding the regenerator space remain within the desired limits even in the case of considerable powers being supplied or taken, for example 20 H.P. and higher.

According to the invention, the regenerator associated with an expansion space and a compression space is subdivided into a number of parallel regenerator elements. Each of the walls of the regenerator elements may thus have a diameter considerably smaller than that of a wall bounding an integral regenerator or a ring-shaped regenerator surrounding a cylinder, hence the wall thickness of the regenerator elements may be considerably smaller.

In a structurally advantageous form of the invention the regenerator elements are arranged in the form of a ring around a cylinder containing the expansion space. It is pointed out that, in double-acting apparatus comprising a number of non-divided regenerators so that each expansion space and compression space is associated with a non-subdivided regenerator, it is known per se to arrange the regenerators and the cylinders in a ring.

In a further structural form of the invention the regenerator elements are cylindrical.

In order that the invention may be readily carried into effect, an example will now be described in detail with reference to the accompanying drawing, in which Fig. 1 is a vertical section through the head of a hot-gas engine taken along the line I—I of Fig. 2, and Fig. 2 is a plan view of this head.

The apparatus comprises a cylinder space in which both a displacer 1 with a cap 2 and a piston 3 are adapted to reciprocating. The displacer 1 varies the volumetric capacity of an expansion space 4 which, through a heater made up of a number of parallel conduits 5, a number of parallel cylindrical regenerator elements 6 forming a first heat exchanger and a number of coolers 7 forming a second heat exchanger which is in communication with a compression space 8, the volumetric capacity of the last-mentioned space being influenced both by the displacer 1 and by the piston 3. Each regenerator element 6 has a regenerator housing 9 of its own into which two conduits 5 empty in this form of construction.

The cylinder space and the regenerator housings 9 are secured to the coolers 7 by means of a plate 10 and screws 11. Since the regenerator has a comparatively small diameter both the side wall of the regenerator and the upper wall may be comparatively thin.

To the heater made up of conduits 5 thermal energy from a burner (not shown) can be supplied in known manner. If this apparatus is employed as a refrigerator, thermal energy is abstracted through conduits 5 from a space to be cooled.

The construction according to the invention may be applied not only in displacer apparatus, of the type described above, but also in other types of thermo-dynamic reciprocating apparatus. The driving mechanism for moving the piston and the displacer upward and downward may be of any conventional type.

What is claimed is:

1. In a thermo-dynamic reciprocating apparatus having a gas of invariable chemical composition therein performing a closed thermo-dynamic cycle and comprising a cylinder, a piston and displacer reciprocating in said cylinder and defining a compression chamber therebetween and an expansion chamber on the opposite side of said displacer, means for communicating with said chambers including a first heat exchanger, a regenerator and a second heat exchanger, the volumetric capacities of the expansion chamber and the compression chamber being varied with a substantially constant phase difference by the reciprocation of said displacer and said piston, said regenerator being subdivided into a plurality of regenerator elements, and at least one conduit for each regenerator element connecting said expansion chamber to said regenerator element.

2. In a thermo-dynamic reciprocating apparatus having a gas of invariable chemical composition therein performing a closed thermo-dynamic cycle and comprising a cylinder, a piston and displacer reciprocating in said cylinder and defining a compression chamber therebetween and an expansion chamber on the other side of said displacer, means for communicating with said chambers including a first heat exchanger, a regenerator and a second heat exchanger, the volumetric capacities of the expansion chamber and the compression chamber being varied with a substantially constant phase difference by the reciprocation of said displacer and said piston, said regenerator being subdivided into a plurality of regenerator elements arranged in a ring about said cylinder, and at least one conduit for each regenerator element connecting said expansion chamber to said regenerator element.

3. In a thermo-dynamic reciprocating apparatus having a gas of invariable chemical composition therein performing a closed thermo-dynamic cycle and comprising a cylinder, a piston and displacer reciprocating in said cylinder and defining a compression chamber therebetween and an expansion chamber on the opposite side of said displacer, means for communicating with said chambers including a first heat exchanger, a regenerator and a second heat exchanger, the volumetric capacities of the expansion chamber and the compression chamber being varied with a substantially constant phase difference by the reciprocation of said displacer and said piston, said regenerator being subdivided into a plurality of cylindrical regenerator elements arranged in a ring about said cylinder, two conduits for each regenerator element connecting said chamber to said regenerator element.

References Cited in the file of this patent

UNITED STATES PATENTS 2,621,474     Dros  ---------------- Dec. 16, 1952